United States Patent [19]

Hügenell

[11] Patent Number: 5,347,401
[45] Date of Patent: Sep. 13, 1994

[54] REFLECTING TELESCOPE AND ITS PRODUCTION PROCESS

[75] Inventor: Hermann Hügenell, Maxdorferstr. 47, Lambsheim, Fed. Rep. of Germany

[73] Assignees: Hermann Hugenell, Lamshein; Karl Friedrich Angstenberger, Ludwigshafen/Rhein, both of Fed. Rep. of Germany

[21] Appl. No.: 776,300

[22] PCT Filed: Jun. 5, 1990

[86] PCT No.: PCT/EP90/00889

§ 371 Date: Dec. 6, 1991

§ 102(e) Date: Dec. 6, 1991

[87] PCT Pub. No.: WO90/15352

PCT Pub. Date: Dec. 13, 1990

[30] Foreign Application Priority Data

Jun. 7, 1989 [DE] Fed. Rep. of Germany ....... 3918620
Jul. 17, 1989 [DE] Fed. Rep. of Germany ....... 3923588

[51] Int. Cl.$^5$ ................................................ G02B 5/10
[52] U.S. Cl. .................................... 359/853; 359/900; 359/858
[58] Field of Search ............... 359/853, 851, 855, 399, 359/742, 900, 846, 848, 849, 366, 365, 364, 858

[56] References Cited

U.S. PATENT DOCUMENTS

| | | | |
|---|---|---|---|
| 1,428,935 | 9/1922 | Bell | 359/364 |
| 3,502,387 | 3/1970 | Hudley | 359/364 |
| 3,507,547 | 4/1970 | Thomas | 359/364 |
| 3,588,270 | 6/1971 | Wells | 359/364 |
| 4,902,102 | 2/1990 | Breidenthal | 359/871 |
| 4,928,435 | 5/1990 | Masaki et al. | 51/165.71 |
| 4,974,368 | 12/1990 | Miyamoto et al. | 51/165.75 |
| 4,993,190 | 2/1991 | Hiyoshi et al. | 51/142 |

OTHER PUBLICATIONS

R. E. Sladky et al., "Fabrication of Off-Axis Parabolic Mirrors", Optical Eng., vol. 17, No. 6, pp. 588–594, Nov.–Dec. 1978.

Primary Examiner—Jon W. Henry
Attorney, Agent, or Firm—McGlew and Tuttle

[57] ABSTRACT

A reflecting telescope is described, in which the surface of the primary mirror is in the form of a pitch circular surface of a hypothetical, rotationally symmetrical large mirror. The optical axis parallel to the incident optical path and the focal point of the primary mirror and the large mirror are consequently identical. The primary mirror or pitch circular surface are located alongside the optical axis, so that all the optical and mechanical aids to be arranged in the vicinity of the focal point can be located outside the light incidence area and the reflection field, without optical correcting means being required.

6 Claims, 5 Drawing Sheets

REFLECTING TELESCOPE AND ITS PRODUCTION PROCESS

FIELD OF THE INVENTION

The invention relates to a reflecting telescope with a tube and a primary mirror located therein, the focal point of the primary mirror being located outside the tube, as well as to a process for the production thereof.

BACKGROUND OF THE INVENTION

Reflecting telescopes are known, in which the optical axis of the primary mirror is parallel to the tube or the light incidence direction. The adaptive optics with the reflecting mirror are located in the focal point in the light incidence area, which leads to shading.

In addition, Wilhelm Herschel discloses a reflecting telescope, whose rotationally symmetrical primary mirror is sloped with respect to the light incidence direction in such a way that the focal point is located outside the tube, so that the adaptive optics can be positioned outside the incidence of light. However, as a result of the mirror slope the light paths differ, which leads to astigmnatic image distortions. Thus, a correcting plate ,must be used for compensating the different light paths.

SUMMARY AND OBJECTS OF THE INVENTION

The problem of the present invention solves, is to provide a reflecting telescope of the aforementioned type, in which the effective radiation incidence area is kept free from optical functional elements, such as e.g. the reflecting mirror with its mounting and the like, but the focal point can still be sufficiently specifically fixed to ensure that no correcting optics are required.

This problem is solved in that the surface of the primary mirror is shaped as a pitch circular surface of a hypothetical, rotationally symmetrical large mirror, whose optical axis is positioned alongside the pitch circular surface and is parallel to the light incidence direction.

Thus, the invention is based on the idea that a hypothetical, rotationally symmetrical large mirror, which cannot be manufactured as a result of its dimensions, has a focal point located in the optical axis, which is free from astigmatic distortions and the like. However, this focal point is not only decisive for the complete large mirror surface, but also for all partial surfaces. Thus, on restricting to a partial surface of the large mirror displaced with respect to the optical axis and which can be obtained as a result of the proportions, then the associated focal point must be located outside the light incidence tube without this leading to optical disadvantages.

Thus, for example, a circular partial surface according to the invention positioned alongside the optical axis has the same intensity distribution of the incident radiation energy in the focal point as a rotationally symmetrical, polished, circular mirror with the same diameter, whose focal length corresponds to that of the inventive partial surface. This means that for an incidence bundle of beams it is completely unimportant whether it strikes a rotationally symmetrical, polished primary mirror, whose optical axis is identical to the rotational axis of symmetry, or a partial surface located alongside the optical axis, whose diffraction aperture considered in the light radiation incidence direction is identical with the diffraction aperture of the rotationally symmetrical, polished mirror. All that is important is the length of the light path to the focal point, so as to occur there in an in-phase manner. This condition is fulfilled with the partial surface according to the invention. It is a surface cutout of the large mirror and therefore images in completely distortion-free manner.

The invention has the advantage that with respect to the adaptive optics and the associated functional elements, no constructional limitations exist, because they are located outside the light/radiation incidence area and therefore neither cause shading, nor project into the reflection field. As the focus of the primary mirror is kept free or undergoes no restriction in its action, a completely lossless light concentration in the focus of the primary mirror is possible.

Fundamentally the primary mirror can be constructed as a monolith. However, it is particularly advantageous for its surface to be formed from a plurality of segments. This not only makes it possible to produce larger diameter primary mirrors, but according to the invention particularly short focal lengths can be obtained, because the necessary concave curvature of the individual segments can be kept relatively shallow. The tube length can also be shortened with the short focal length.

As a result of this size reduction the infrastructure of the reflecting telescope can be made more economic and e.g. the protective done required for protection against the weather and external influences can be made smaller.

It is particularly advantageous that a secondary reflecting mirror is located in the reception area of the focus of the primary mirror and the secondary mirror is movable at right angles to the optical axis of the primary mirror. This has the advantage that without any long interruption of telescope operation, it is possible to switch from one observation mode to the other. The secondary reflecting mirror can be moved directly and in computer-controlled manner into the optical path, so as to permit the desired focus.

It is also advantageous that there is a second reflecting mirror movable parallel to the optical axis within the optical path of the first secondary reflecting mirror and which makes it possible to set different foci for telescope operation. This makes it possible to obtain very short switching operations between the focal areas, which can once again take place automatically and in computer-controlled manner.

The mechanical means necessary for the switching operations, in the same way as the secondary optical means and the in each case associated control means, can be given a particularly simple construction with respect to their mounting, control, etc., in that all the observation points which can be controlled from the focal point are located in a single plane passing through the optical axis and the centre of the primary mirror. This has the advantage that the beam guidance and the tracking of the observation points can take place with especially simple means, particularly even in the case that the reflecting telescope is rotated about its horizontal mounting axis.

In the case of a telescope formed by mirror segments, the process problem is solved in that individual mirror segment blanks are so preshaped with a surface that in the case of continuous joining together of all the mirror segment blanks to form a primary mirror blank the surfaces are initially summated to form a spherical cap, whose curvature approaches in optimum manner the aspherical final shape of the primary mirror and that subsequently the surfaces of the individual mirror segment blanks are reworked for producing the final surface.

This has the advantage that the primary mirror according to the invention can be manufactured at limited cost, e.g. in a lightweight honeycomb structure and mainly from quartz. The production costs during polishing are kept very low as a result of this preproduction process relating to each mirror segment.

In the case of a diameter of approximately 5 to 8 m, the spherical curvature of the primary mirror blank diverges by approximately 1 mm from the aspherical final shape. Thus, only fractions of a millimetre have to be polished in the reworking phase.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

FIG. 1 Diagrammatically a plan view of a rotationally symmetrical, hypothetical large mirror with a pitch circular surface serving as the primary mirror of a reflecting telescope.

FIG. 2 Diagrammatically a vertical cross-section through a reflecting telescope.

FIG. 3 Diagrammatically and in vertical cross-section further details of the reflecting telescope according to FIG. 2.

FIG. 4 Diagrammatically a vertical cross-section through a primary mirror blank.

FIG. 5 Diagrammatically a vertical cross-section through a mirror segment blank and an associated blank body.

DETAILED DESCRIPTION OF THE PREFERRED EMBODIMENT

Figure 1:
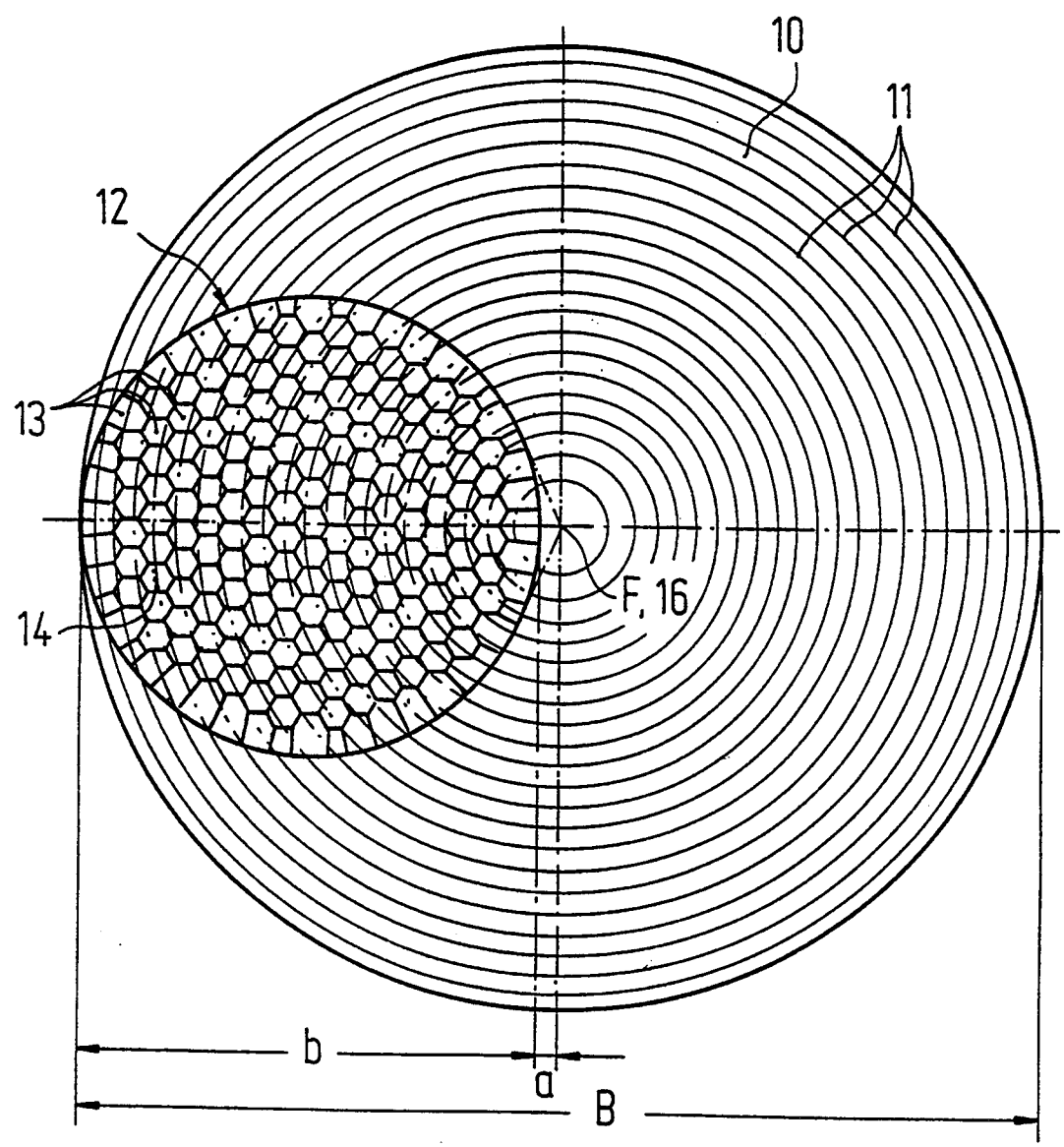

In FIG. 1 10 is a hypothetical large mirror 10, which in practice cannot be produced in this size and which has a diameter B. The large mirror 10 is aspherical and rotationally symmetrical, which is indicated by the concentric circles 11. The hypothetical large mirror 10 is used for fixing the geometrical sizes of a pitch circular surface 12 with the diameter B. The diameter B of the pitch circular surface 12 substantially corresponds to the primary mirror diameter of conventional reflecting telescopes. In the represented embodiment the pitch circular surface 12 is formed by means of a honeycomb mirror segment 13 to a primary mirror 14 of a reflecting telescope 15 to be described in greater detail relative to FIGS. 2 and 3. As illustrated in FIG. 1, the focal point F of the hypothetical large mirror 10 is also the focal point of the pitch circular surface 12 or the primary mirror 14. Thus, with respect to their optical characteristics, the mirror segments 13 are not rotationally symmetrical to the pitch circular surface 12 and instead, for focussing on the focal point F, are rotationally symmetrical to the large mirror 10.

The optical axis 16 passing through the focal point F is therefore simultaneously the optical axis of the large mirror 10 and the pitch circular surface 12 or the primary mirror 14. Focal point F is at a predetermined distance "a" outside the pitch circular surface 12, or, in other words, in the projection at right angles to the drawing plane, focal point F is outside the pitch circular surface 12 or the primary mirror. The distance of "a" is chosen in such a way that the adaptive optics 17 (FIG. 3) to be arranged in the focal point F and further functional elements necessary for deflecting the beams 18 (FIG. 2) reflected by the primary mirror 14 are positioned outside the pitch circular surface 12, so that there is no shading of the light incidence beans 19 (FIG. 2) at right angles to the drawing plane and the reflection field 20 (FIGS. 2, 3) is kept free.

Figure 2:
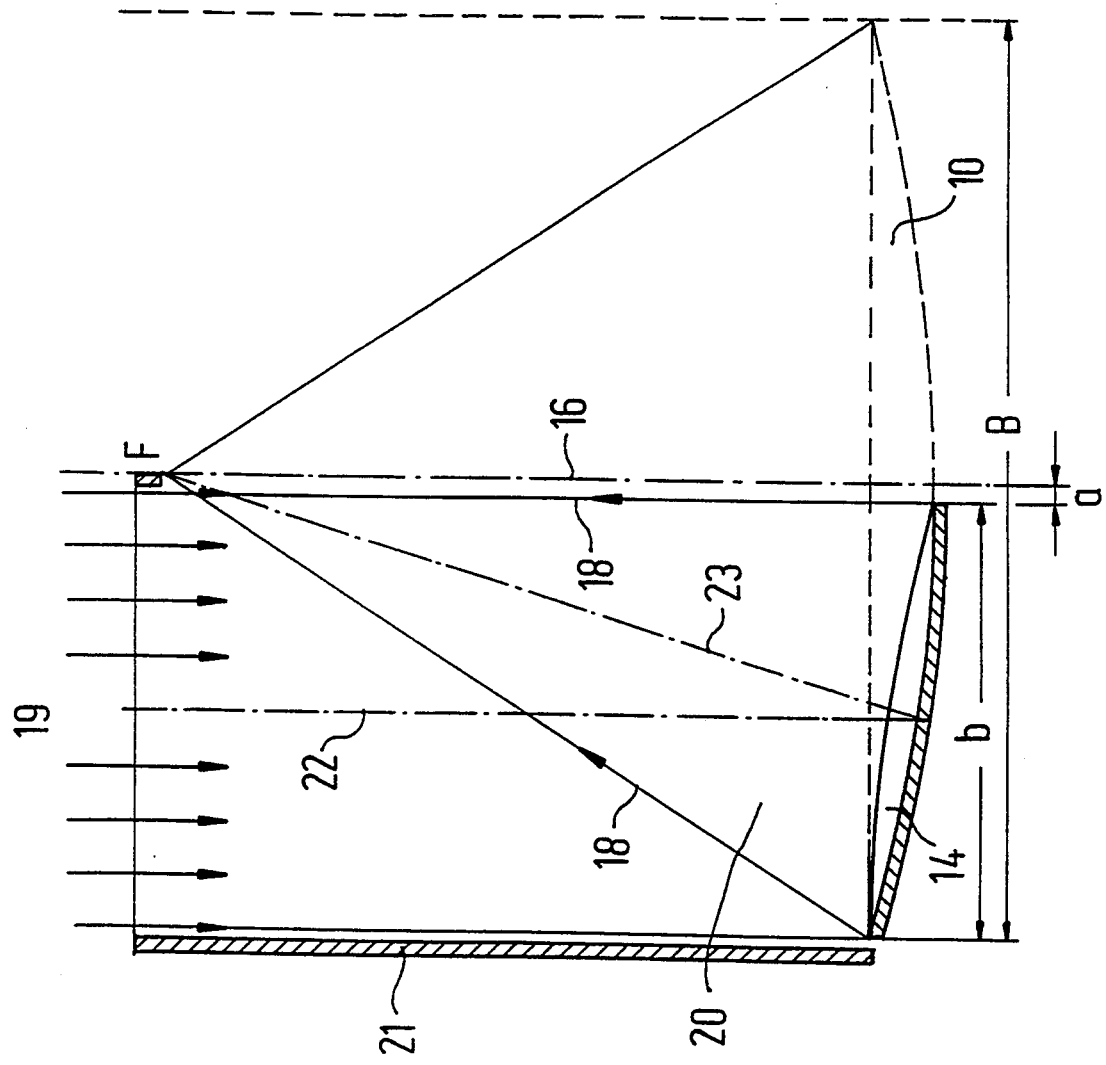

In the cross-sectional view according to FIG. 2, the primary mirror 14 or the pitch circular surface 12 is located in a tube 21 and is shown in continuous line form. To facilitate understanding, the remainder of the hypothetical large mirror 10 is shown in broken line form. Tube 21 is parallel to the optical axis 16 and the light incidence beams 19. A central, incident light beam is designated 22 and the associated reflection bean 23.

Figure 3:
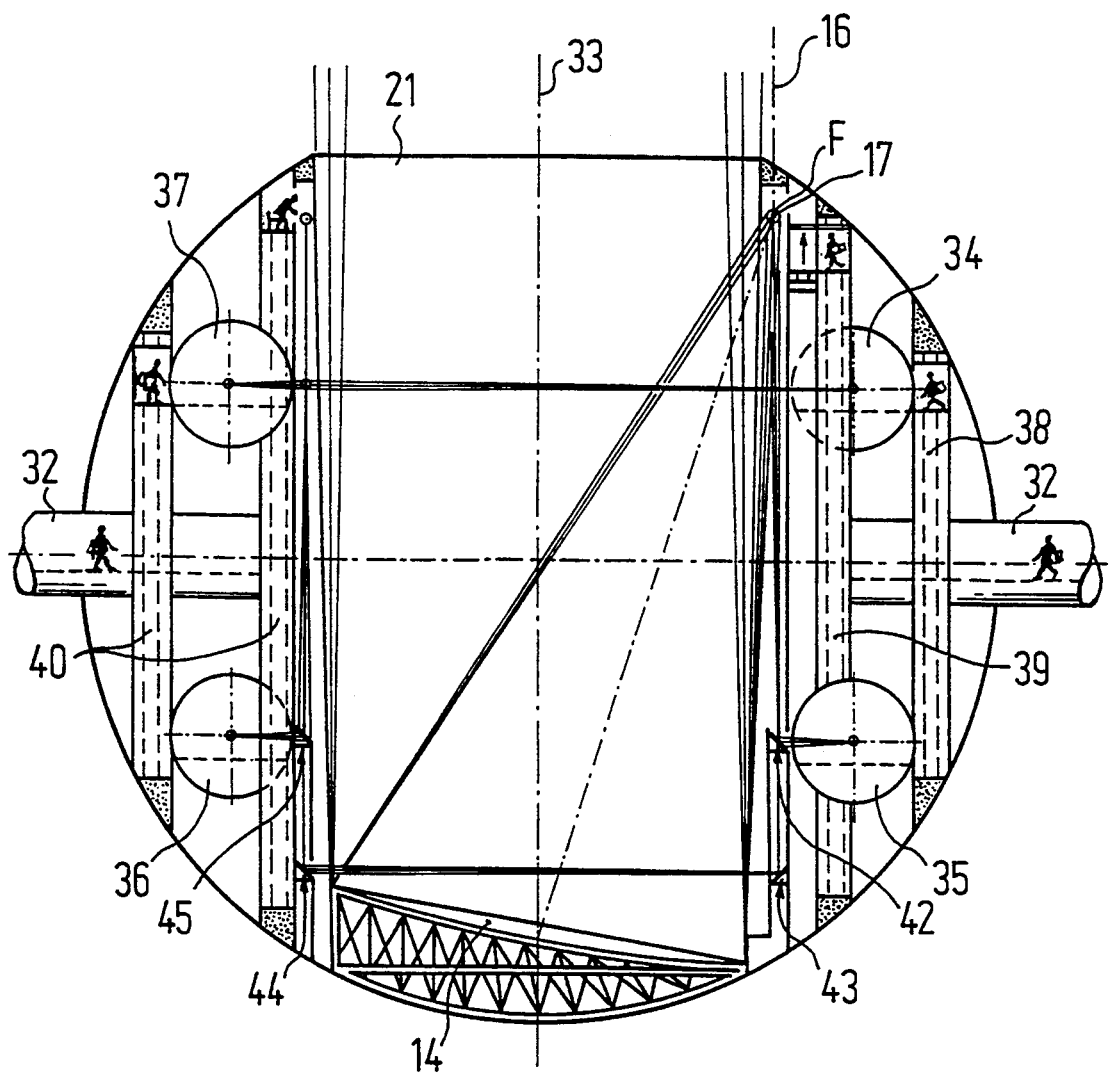

The reflecting telescope 30 according to FIG. 3 comprises a spherical casing 31, which is mounted in rotary manner by means of two tubular, walk-through, vertical shafts 32 in a not shown support structure, which is e.g. described in DE-C-37 07 642. By means of the support structure the spherical casing 31 can be pivoted both about the shafts 32 and with the shafts 32 about a vertical axis 33. The latter is at the sane time the longitudinal axis of tube 21, which is fixed in the spherical casing 10. Primary mirror 14 according to FIG. 2 is mounted on the bottom of tube 21. Several observation cabins 34, 35, 36, 37 are located within the spherical casing 31. All the observation cabins 34 to 37 are located in a plane (drawing plane) passing through the optical axis 16 and the centre of the primary mirror 14.

Between the access-providing, tubular shafts 32 and the observation cabins 34 to 37 are provided vertically directed elevators or lifts 38, 39, 40, which are parallel to the optical axis 16.

In the vicinity of focal point F, there is movably located a first convex secondary reflecting mirror making it possible to modify the focal length of primary mirror 14. The first secondary reflecting mirror 41 reflects the beams focussed on focal point F on second convex secondary reflecting mirrors 42, 43, 44, 45, which are movably positioned parallel to optical axis 16 and in the plane of observation cabins 34 to 37.

Figure 4:
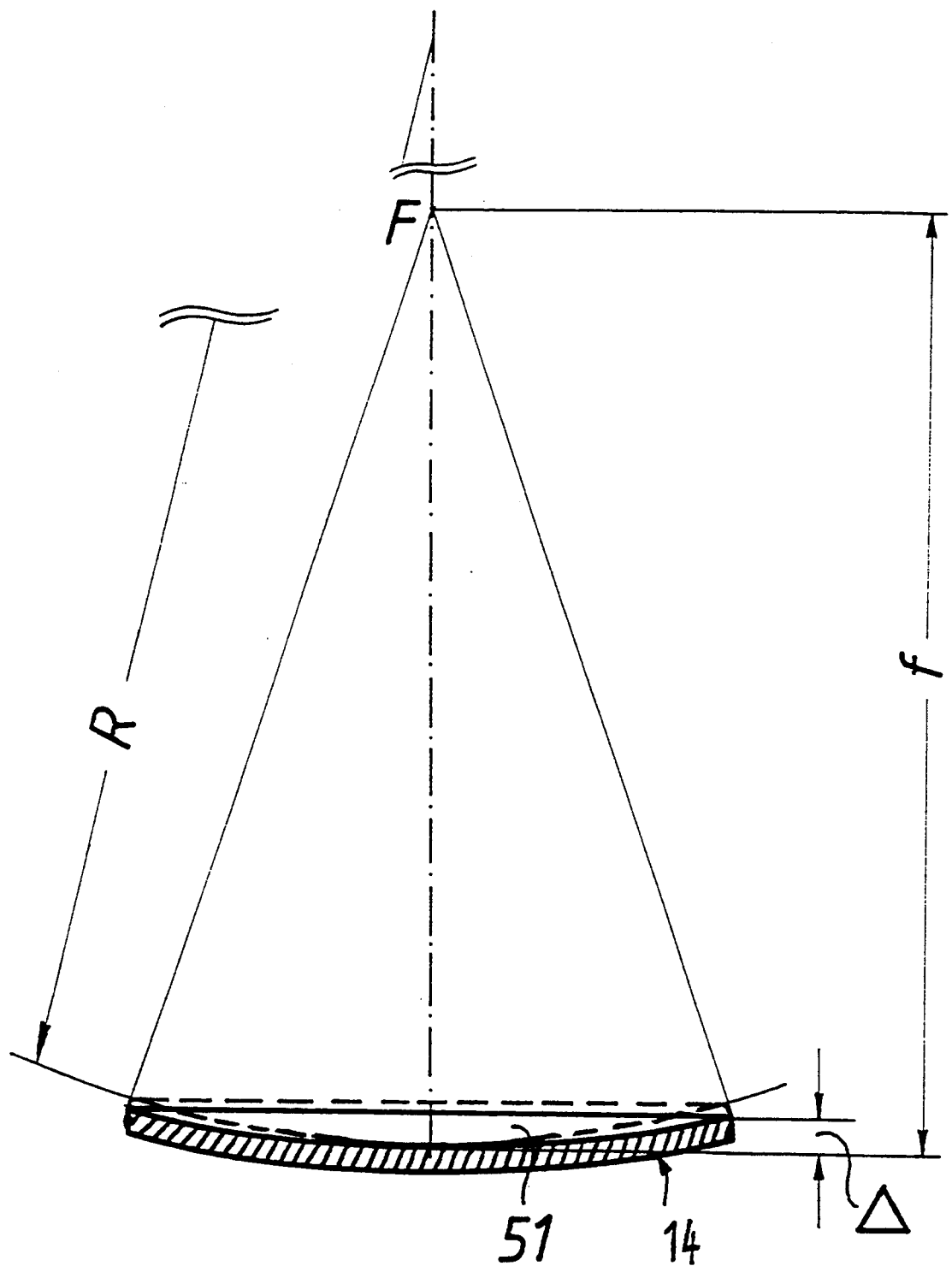

FIG. 4 illustrates in broken line form and in cross-section a spherically curved primary mirror blank, which with a lightweight honeycomb structure of individual mirror segment blanks 52 (FIG. 5) is formed into a spherical cap 51. The radius of the resulting spherical cap 51 is R=2f, in which f is the vertical circle radius of the primary mirror 14 described relative to the preceding drawings. The concave surface of the spherical cap 51 differs with minimum tolerances from the aspherical surface of the primary mirror 14, so that only slight polishing is required.

Figure 5:
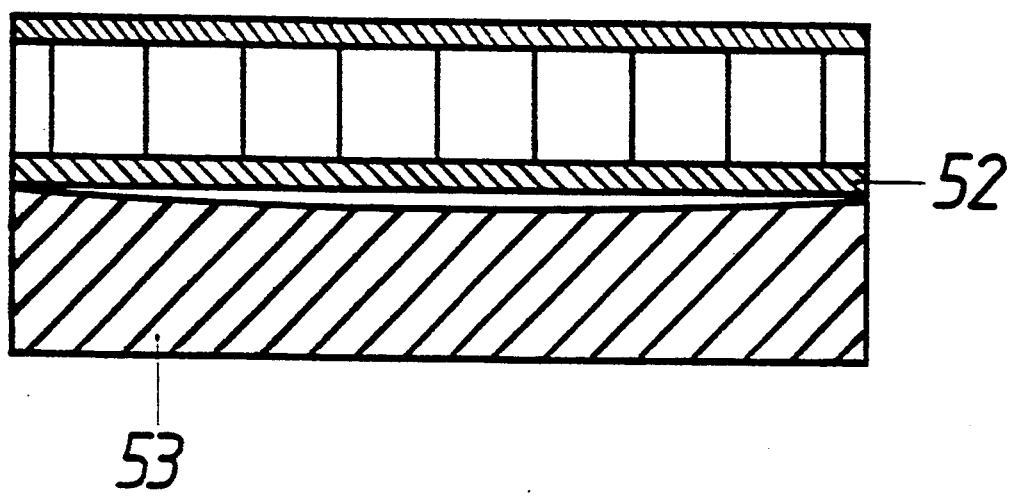

In FIG. 5, 53 is a blank body with an aspherically curved surface, which is used for producing a mirror segment blank 52. The latter can e.g. be made from quartz or other equivalent, preshapable materials. Shaping takes place under heat, pressure, etc. By juxtaposing a plurality of such mirror segment blanks 52 a primary mirror blank in the form of a spherical cap 51 and as shown in FIG. 4 is obtained.

While specific embodiments of the invention have been shown and described in detail to illustrate the application of the principles of the invention, it will be understand that the invention may be embodied otherwise without departing from such principles.

I claim:

1. A method of manufacturing a primary mirror for a reflecting telescope with a tube and the primary mirror being located therein, the focal point of the primary mirror being outside the tube, the surface of the primary mirror being aspherical and in the form of a circular pitch surface of a hypothetical, rotationally symmetrical large mirror with an aspherical surface, whose optical axis is located alongside the circular pitch surface of the primary mirror and is parallel to the light incidence direction, the method comprising the steps of:

producing of individual mirror segment blanks, whose shape is determined by dividing the aspherical surface of the circular primary reflector into single sections;

preshaping a mirror surface of the individual mirror blanks to form a spherical surface whose curvature approaches substantially the aspherical surface of the primary mirror;

reworking of the mirror surface of the individual mirror blanks for producing a final aspherical surface shape of the mirror surface of each mirror segment; and joining together the reworked mirror blanks to form the primary reflector.

2. A method according to claim 1, wherein the curvature of the spherical surface of the individual mirror blanks defers by approximately 1 mm from the final aspherical surface shape if a diameter of the primary mirror is approximately 5 to 8 m.

3. A method according to claim 1, wherein: the mirror segment blanks are manufactured in a lightweight honeycomb structure and predominantly from quartz.

4. A method of manufacturing a primary mirror for a reflecting telescope with the tube and the primary mirror being located therein, the focal point of the primary mirror being outside the tube, the surface of the primary mirror being aspherical and in the form of a circular pitch surface of a hypothetical, rotationally symmetrical large mirror with an aspherical surface, whose optical axis is located alongside the circular pitch surface or the primary mirror and is parallel to the light incidence direction, the method comprising the steps of:

producing individual mirror segment blanks having a light weight honey comb structure and a mirror surface.

preshaping a mirror surface of the individual mirror blanks to form a spherical surface whose curvature approaches substantially the aspherical surface of the primary mirror;

reworking of the mirror surface of the individual mirror blanks for producing a final aspherical surface shape of the mirror surface of each mirror segment; and joining together the reworked mirror blanks to form the primary reflector.

5. A method for forming a reflecting telescope, formed by the steps of:

designing an aspherical surface of a primary mirror to be substantially similar to an aspherical surface of a portion of a hypothetical large primary reflecting mirror, said portion of said hypothetical large primary reflecting mirror being spaced from an optical axis of said hypothetical primary mirror;

dividing said aspherical surface of said primary mirror into a plurality of segments, each of said segments having an aspherical surface combining to form said aspherical surface of said primary mirror;

creating a plurality of mirror blanks with a mirror surface for each of said plurality of segments of said primary mirror;

preshaping each of said plurality of mirror blanks to form the mirror surface into a spherical shape whose curvature is substantially similar to said aspherical surface of a corresponding segment of said primary mirror;

reworking said spherical surface of each of said plurality of mirror blanks into said aspherical surface of said corresponding segment of said primary mirror;

joining said plurality of mirror blanks together to form said primary mirror;

positioning said primary mirror to receive incident radiation along a direction substantially parallel to said optical axis of said hypothetical large primary mirror; and positioning a secondary mirror at a focal point of said hypothetical primary reflecting mirror and spaced from said incident radiation.

6. A method in accordance with claim 5, wherein:

said portion of said hypothetical primary reflecting mirror is substantially circular.

* * * * *